(12) United States Patent
Stewart et al.

(10) Patent No.: US 7,899,805 B2
(45) Date of Patent: Mar. 1, 2011

(54) AUGMENTING URL QUERIES

(75) Inventors: Ryan Stewart, Snoqualmie, WA (US); Girish Kumar, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 432 days.

(21) Appl. No.: 11/848,656

(22) Filed: Aug. 31, 2007

(65) Prior Publication Data

US 2009/0063457 A1 Mar. 5, 2009

(51) Int. Cl.
*G06F 7/00* (2006.01)
(52) U.S. Cl. ..................................... 707/708
(58) Field of Classification Search ............ 707/3, 707/708, 999.003
See application file for complete search history.

(56) References Cited

U.S. PATENT DOCUMENTS

| | | | |
|---|---|---|---|
| 5,920,854 A * | 7/1999 | Kirsch et al. ............ | 707/3 |
| 6,615,237 B1 * | 9/2003 | Kyne et al. ............. | 709/203 |
| 6,625,644 B1 * | 9/2003 | Zaras .................. | 709/217 |
| 6,636,854 B2 | 10/2003 | Dutta et al. | |
| 6,711,568 B1 | 3/2004 | Bharat et al. | |
| 6,718,324 B2 | 4/2004 | Edlund et al. | |
| 6,732,088 B1 | 5/2004 | Glance | |
| 6,999,959 B1 | 2/2006 | Lawrence et al. | |
| 2003/0020746 A1 * | 1/2003 | Chen et al. ............. | 345/741 |
| 2003/0084034 A1 | 5/2003 | Fannin | |
| 2004/0210602 A1 | 10/2004 | Hillis et al. | |
| 2007/0055646 A1 | 3/2007 | Zeng et al. | |
| 2007/0112734 A1 * | 5/2007 | Xin et al. .............. | 707/3 |
| 2007/0112761 A1 | 5/2007 | Xu et al. | |

OTHER PUBLICATIONS

Craig Silverstein, Monika Henzinger, Hannes Marais, and Michael Moricz, "Analysis of a Very Large Web Search Engine Query Log," pp. 6-12, http://delivery.acm.org/10.1145/340000/331405/p6-silverstein.pdf?key1=331405&key2=9514003811&coll=GUIDE&dl=GUIDE&CFID=26867122&CFTOKEN=14099428, ACM SIGIR Forum vol. 33 Issue 1 Fall 1999.

Yen-Yu Chen, Torsten Suel, and Alexander Markowetz, "Efficient Query Processing in Geographic Web Search Engines," 12 pages, http://cis.poly.edu/suel/papers/geoquery.pdf, *SIGMOD '06* Proceedings of the 2006 ACM SIGMOD international conference on Management of data.

(Continued)

*Primary Examiner*—Debbie Le
*Assistant Examiner*—Gary Koo
(74) *Attorney, Agent, or Firm*—Shook, Hardy & Bacon L.L.P.

(57) ABSTRACT

Computer-readable media, systems, and methods for augmenting URL queries are described. In embodiments, a URL query is received from a user and it is determined whether the URL query is a simple URL query. Further, if the URL query is a simple URL query, an augmented query is created by word-breaking at least a portion of the URL query and the augmented query is associated with one or more ranking preferences. In various other embodiments, a URL query is received from a user and it is determined whether the URL query is a complex URL query. Further, if the URL query is a complex URL query, an augmented query is created that is identical to the URL query and the augmented query is associated with one or more ranking preferences.

16 Claims, 3 Drawing Sheets

OTHER PUBLICATIONS

Don Turnbull, "Augmenting Information Seeking on the World Wide Web Using Collaborative Filtering Techniques," 9 pages, http://web.utk.edu/dania/2005/Information%20Seeking.doc; http://www.gslis.utexas.edu/donturn/research/augmentis.html#Heading4, 2000.

* cited by examiner

AUGMENTING URL QUERIES

CROSS-REFERENCE TO RELATED APPLICATIONS

Not applicable.

SUMMARY

Embodiments of the present invention relate to computer-readable media, systems, and methods for augmenting uniform resource locator (URL) queries. In embodiments, a URL query is received from a user and it is determined whether the URL query is a simple URL query or a complex URL query. If the URL query is a simple URL query, an augmented query is created by word-breaking at least a portion of the URL query and if the URL query is complex, an augmented query is created that is identical to the URL query. Further, in embodiments, the augmented query is associated with one or more ranking preferences.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
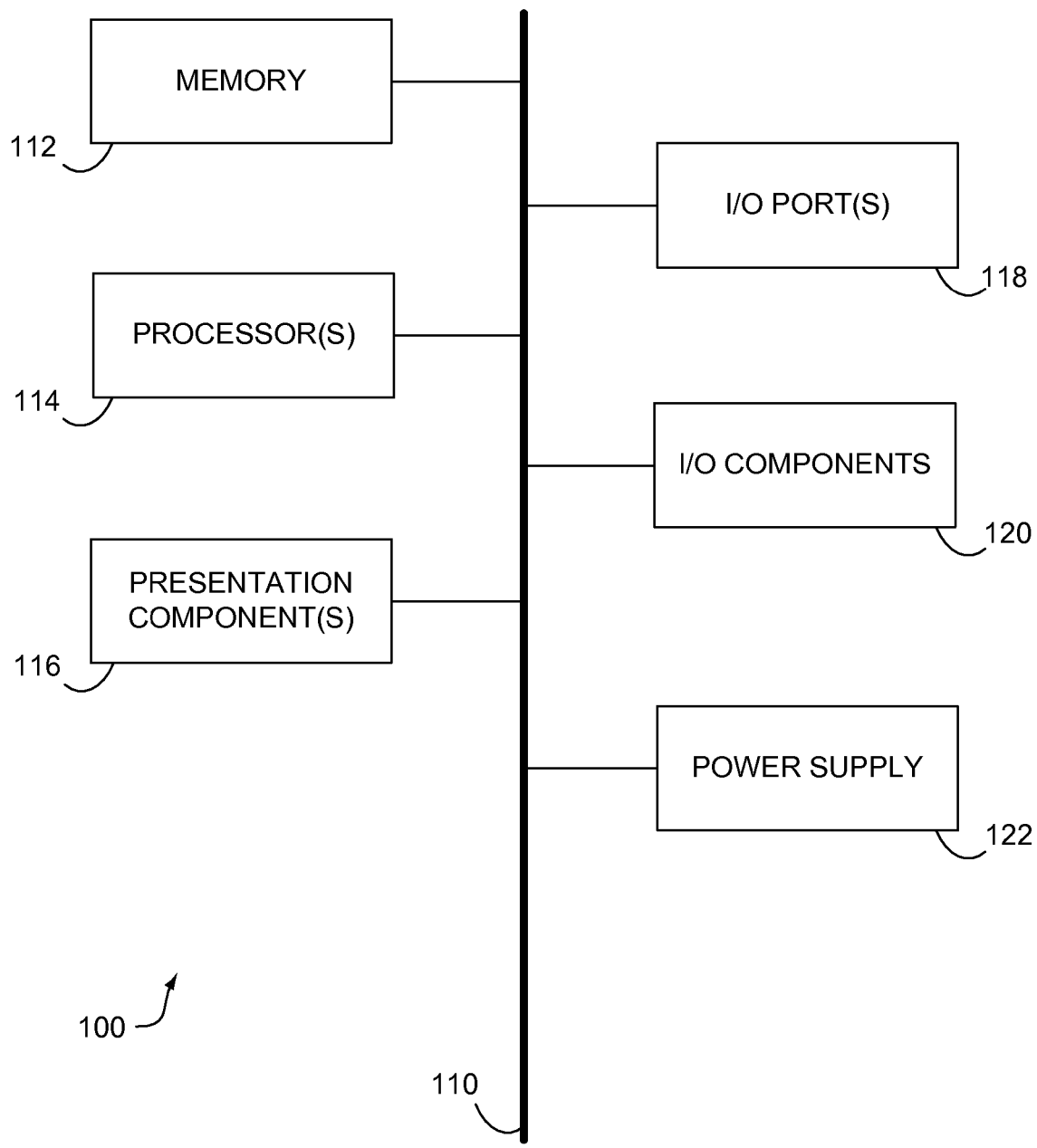
FIG. 1 is a block diagram of an exemplary computing system environment suitable for use in implementing the present invention.

The subject matter of the present invention is described with specificity herein to meet statutory requirements. However, the description itself is not intended to limit the scope of the patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of the individual steps is explicitly described.

Embodiments of the present invention provide computer-readable media, systems, and methods for augmenting URL queries. In various embodiments, a URL query is received from a user and it is determined whether the URL query is a simple URL query or a complex URL query. If the URL query is a simple URL query, an augmented query is created by word-breaking at least a portion of the URL query and if the URL query is complex, an augmented query is created that is identical to the URL query. Further, in various embodiments, the augmented query is associated with one or more ranking preferences. Embodiments discussed herein use the phrase "URL query" to describe queries including a web address of a particular webpage. The phrase "URL query," however, is not limited to only locators and may also include identifiers. For instance, as used herein, the phrase "URL query" may include queries directed to uniform resource identifiers (URIs) as well as queries directed to uniform resource locators. Additionally, as used herein, the phrase "URL query" may also include both relative URLs and absolute URLs. Further, the phrase "URL query" may alternatively be referred to as a query directed to a document name and/or a website address. Stated differently, the term "URL query" as used herein includes various strings that may be entered into an address field of a web browser for the purpose of displaying a particular web page and/or web site.

Accordingly, in one aspect, the present invention is directed to one or more computer-readable media having computer-usable instructions embodied thereon for performing a method of augmenting URL queries in a search engine. The method includes receiving a URL query from a user and determining whether the URL query is a simple URL query. If the URL query is a simple URL query, then the method further includes creating an augmented query by word-breaking at least a portion of the URL query and associating the augmented query with one or more ranking preferences.

In another aspect, the present invention is directed to one or more computer-readable media having computer-usable instructions embodied thereon for performing a method of augmenting URL queries in a search engine. The method includes receiving a URL query from a user and determining whether the URL query is a complex URL query. If the URL query is a complex URL query, then the method further includes creating an augmented query identical to the URL query and associating the augmented query with one or more ranking preferences.

In yet another aspect, the present invention is directed to a computerized system for augmenting URL queries in a search engine. The system includes a receiving component configured to receive a URL query from a user and a determining component configured to determine whether the URL query is a simple URL query or a complex URL query. The system further includes a simple URL augmenting component configured to create an augmented query from a simple URL query by word-breaking at least a portion of the URL query, and further configured to associate the augmented query with one or more simple URL ranking preferences. Further, the system includes a complex URL augmenting component configured to create an augmented query from a complex URL query, the augmented query being identical to the URL query, and further configured to associate the augmented query with one or more complex URL ranking preferences. Still further, the system includes a database for storing information associated with processing the URL query.

Having briefly described an overview of embodiments of the present invention, an exemplary operating environment is described below.

Referring to the drawing figures in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the present invention may be described in the general context of computer code or machine-usable instructions, including computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including, but not limited to, hand-held devices, consumer electronics, general purpose computers, specialty computing devices, and the like. Embodiments of the invention may also be practiced in distributed computing environments where tasks are performed by remote processing devices that are linked through a communications network. In a distributed computing environment, program modules may be located in association with both local and remote computer storage media including memory storage devices. The computer useable instructions form an interface to allow a computer to react according to a source of input. The instructions cooperate with other code segments to initiate a variety of tasks in response to data received in conjunction with the source of the received data.

Computing device 100 includes a bus 110 that directly or indirectly couples the following elements: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. Thus, it should be noted that the diagram of FIG. 1 is merely illustrative of an exemplary computing device that may be used in connection with one or more embodiments of the present invention. Distinction is not made between such categories as "workstation," "server," "laptop," "hand held device," etc., as all are contemplated within the scope of FIG. 1 and reference to the term "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid state memory, hard drives, optical disc drives, and the like. Computing device 100 includes one or more processors that read from various entities such as memory 112 or I/O components 120. Presentation component(s) 116 present data indications to a user or other device. Exemplary presentation components include a display device, speaker, printing component, vibrating component, and the like.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
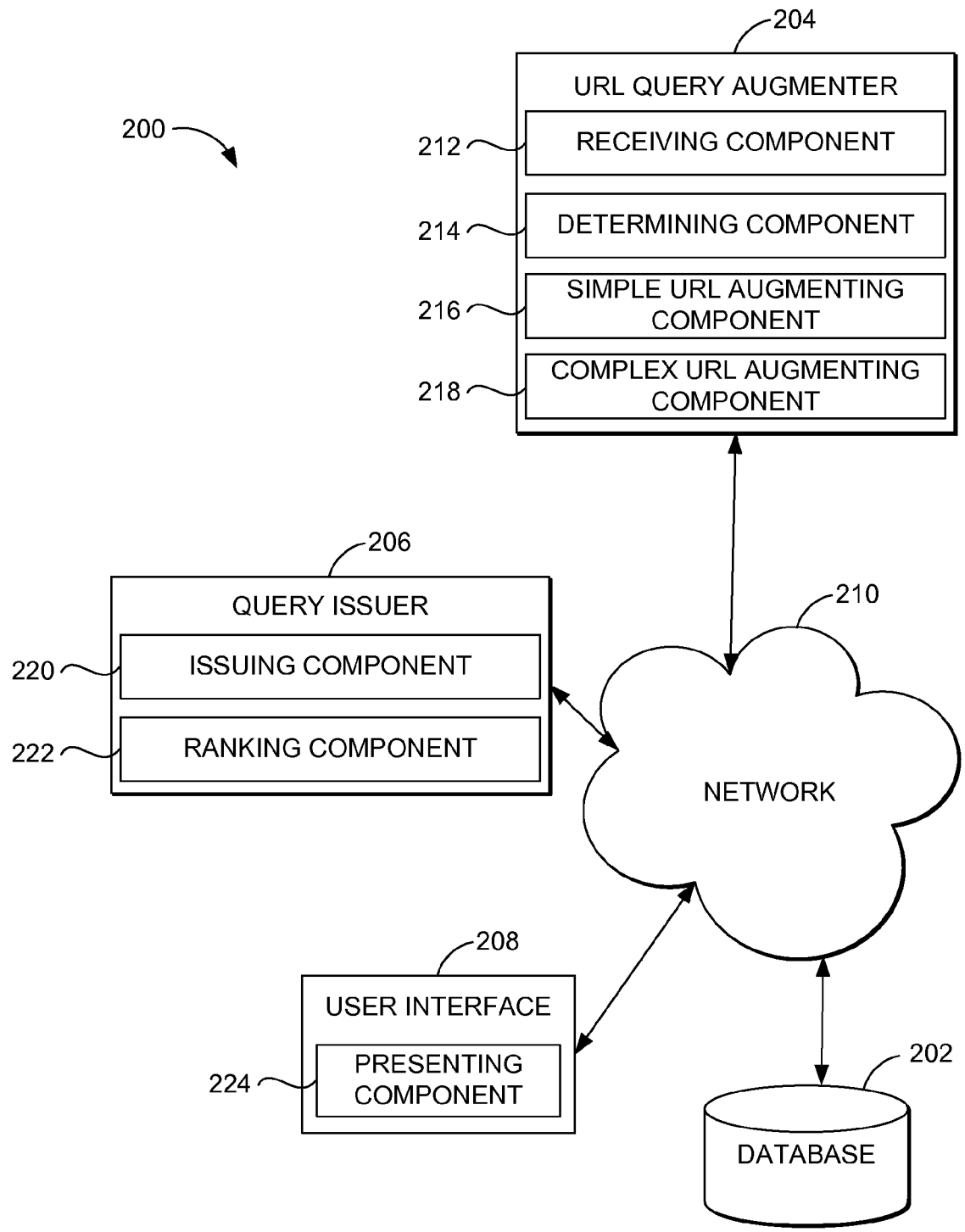
FIG. 2 is a block diagram illustrating an exemplary system for augmenting URL queries, in accordance with an embodiment of the present invention.

Turning now to FIG. 2, a block diagram is provided illustrating an exemplary system 200 for augmenting URL queries, in accordance with an embodiment of the present invention. The system 200 includes a database 202, a URL query augmenter 204, a query issuer 206, and a user interface 208 in communication with one another via network 210. Network 210 may include, without limitation, one or more local area networks (LANs) and/or wide area networks (WANs). Such networking environments are commonplace in offices, enterprise-wide computer networks, intranets, and the Internet. Accordingly, network 210 is not further described herein.

Database 202 is configured to store information associated with URL queries. In various embodiments, without limitation, such information may include the text of the URL query, various portions of the URL query, various arrangements of portions of the URL query, ranking preferences for association with a query, and various other types of configurable query information. In various embodiments, database 202 is configured to be searchable so that URL query augmenter 204 and/or query issuer 206 may retrieve ranking preferences and query information associated with a query. Database 202 may be configurable and may include various information relevant to augmenting URL queries. The content and/or volume of such information are not intended to limit the scope of embodiments of the present invention in any way. Further, although illustrated as a single, independent component, database 202 may, in fact, be a plurality of databases, for instance, a database cluster, portions of which may reside on a computing device associated with URL query augmenter 204 and/or query issuer 206, associated with user interface 208, on another external computing device, or any combination thereof.

URL query augmenter 204 may be a type of computing device, such as computing device 100 described with reference to FIG. 1, for example. As illustrated in FIG. 2, URL query augmenter 204 is separate from query issuer 206. This is intended for illustrative purposes only and is not meant to limit the system of the present invention to any particular compartmentalized configuration. For example, in various embodiments, URL query augmenter 204 and query issuer 206 may reside on or comprise a single computing device. Each of these configurations, and others, are included within the scope of the present invention. As illustrated in FIG. 2, URL query augmenter 204 includes a receiving component 212, a determining component 214, a simple URL augmenting component 216, and a complex URL augmenting component 218. In various embodiments, URL query augmenter 204 may be used to determine whether a received URL query is a simple URL query or a complex URL query, augment the simple or complex URL query, and associate ranking preferences with the received query. In various embodiments, as will be discussed in more detail herein, the received query may be a simple URL such as, by way of example, "http://www.cityofseattle.com." In various other embodiments, the received query may be a complex URL such as, "http://www.cityofseattle.com/tourism/restaurants/home," that includes one or more path depth indicators in addition to the domain name and generic URL information. For instance, here the path depth indicators are "/tourism," "/restaurants," and "/home." The augmented query and ranking preferences allow URL query augmenter 204 to capture and preserve the query intent of a user. Stated differently, a user's query intent includes the type of documents a user seeks to retrieve from a search engine by entering a particular search. For example, where the query entered by a user is a URL query, depending upon whether the query is simple or complex, the user may intend to retrieve the specific document with an identical URL as the query, or the user may be seeking various documents with information relevant to the domain in the URL query.

Before engaging in discussion of the details of the various components included within URL query augmenter 204, an exemplary overview discussion will be presented to help illustrate the functionality of URL query augmenter 204 in various embodiments. In one example, where the URL query is a simple query, such as "http://www.cityofseattle.com," the user likely seeks information on Seattle, Wash. In this example, URL query augmenter 204 is configured to recognize the simple URL query and will create an augmented query designed to capture and preserve the user's intent. Here, by way of example, the augmented query may be a word-broken version of the domain name in the user's original URL search ("city of seattle"). Issuing a query, e.g., with query issuer 206, using the augmented query "city of seattle" will return various results relevant to the city of Seattle, preserving the user's intent and providing the user with a useful list of results. In addition to augmenting the text of the query itself, URL query augmenter 204 may associate the augmented query with a set of one or more ranking preferences, designed to further augment the results to provide relevant information to the user. For instance, assuming a document has a URL that directly matches the simple URL query inputted by the user, URL query augmenter 204 may force (e.g., by instructing query issuer 206 to force) that document to the top of the results list. Further, if any of the returned documents has a URL in which one of the terms in the domain matches one of the word-broken terms in the original URL query domain, those documents may be boosted because they are likely responsive to the user's query and relevant to the user's intent. Stated differently, if the user enters the simple URL query "http://www.cityofseattle.com," and one of the returned documents is "http://www.seattle.com," that document may be boosted in the results list in accordance with the user's likely intent to retrieve information on Seattle. Thus, the intent of the user is preserved using two techniques: (1) augmenting the text of the actual query; and (2) associating the query with a set of ranking preferences to boost relevant documents.

As discussed herein, the term "boost," and variations thereof, refers to altering the positioning of a result in a list of results. For instance, if "http://www.seattle.com" would appear as result 15 out of a result list of 30 in a typical issued query, boosting "http://www.seattle.com" would alter the results list such that the document appears as, for instance, result five out of the result list of 30. As will be understood and appreciated by one of ordinary skill in the art, there are various ways to achieve the result of boosting documents. For instance, where documents are positioned in a results list based upon the relevance of the document, boosting the document may involve giving the document a higher relevance score, where appropriate (of course, where percentage relevance scores are used, the boosted score should not exceed 100 percent). In another example, boosting the document may involve moving the document a defined number of positions higher in a results list (e.g. 10 positions) without, obviously, ranking a document higher than the first position. In yet another example, boosting the document may involve placing the document within a specific range in the results list (e.g., top five positions, top 10 positions, first page, etc.). These and other boosting schemes are contemplated and within the scope of the present invention.

Returning to the exemplary queries, in another example, where the URL query is a complex query, such as "http://www.cityofseattle.com/tourism/restaurants/home," the specificity of the path of the URL query likely indicates that the user seeks only information related to a document with a URL identical to the URL included in the query. In this example, URL query augmenter 204 is configured to recognize the complex URL query and will create an augmented query designed to capture and preserve the user's intent. Because the user's intent is likely for the exact URL, in this example the augmented query will be identical to the URL query to preserve the user's specific intent. Issuing a query, e.g., with query issuer 206, using the augmented query will return only a specific document with a URL identical to the URL query. In addition to augmenting the text of the query, URL query augmenter 204 may again associate the augmented query with a set of one or more ranking preferences designed to ensure the search results adhere to the user's intent. For example, the ranking preferences may force (e.g., by instructing query issuer 206 to force) a document having a URL matching the URL query to the top of a results list. The ranking preferences may also include a preference for only the specific document matching the query, excluding other returned results from being displayed in the results list because the user is likely not interested in those results. For instance, where the complex URL query remains "http://www.cityofseattle.com/tourism/restaurants/home," the user is not likely to be interested in an article in an online Seattle newspaper discussing various Seattle dining websites and including "http://www.cityofseattle.com/tourism/restaurants/home" as a reference in the text. Instead, the user is probably only interested in the identical matching document, and any superfluous information presented along with the search results only serves to clutter the results and potentially confuse and frustrate the user. Thus, the intent of the user is preserved in this example using two techniques: (1) creating an augmented query that is an identical match to the URL query; and (2) associating the query with a set of ranking preferences that boost identical matches and exclude any other references. Although referred to in this example as ranking preferences, one of skill in the art will understand and appreciate that the functionality of boosting identical matches and excluding other references may be performed by a matching operator. Utilizing a matching operator to boost identical matches and exclude other references is contemplated and within the scope of the present invention.

Having provided an overview discussion of URL query augmenter 204 with two exemplary embodiments, the various components of URL query augmenter 204 will now be discussed. Receiving component 212 is configured to receive a URL query from a user. Receiving component 212 may or may not receive the query directly from the user. For instance, in various embodiments, receiving component 212 may receive the query directly from the user in a traditional search engine environment, e.g., through user interface 208. In other embodiments, URL query augmenter 204 may be separate from the search engine and, thus, receiving component 212 may receive the query from the search engine that receives the query from the user. In those embodiments, the search engine itself acts as an intermediary between the user and receiving component 212. Each of these receiving configurations, and others, is contemplated and included within the scope of the present invention.

Determining component 214 is configured to determine whether the URL query is a simple URL query or a complex URL query. In various embodiments, determining component 214 may also be configured to perform an initial determination regarding whether a query is a URL query. For example, in those embodiments, determining component 214 may first determine that a query is a URL query and, subsequently, determining component 214 may determine whether the URL query is a simple URL query or a complex URL query. As previously discussed, the simple/complex URL query distinction is, in various embodiments, utilized to capture the query intent of the user. Where the URL query is a general domain, the user probably seeks documents having information regarding any terms in the domain name of the URL. Conversely, where the URL query is specific, including one or more layers of path depth, the user is likely seeking a document with a URL identical to the URL in the query. Thus, by way of example, determining component 214 may distinguish between a simple and a complex URL query by determining whether there are any layers of path depth, or path depth indicators, associated with the query. In some embodiments, any indication of path depth may indicate a complex URL query. In other embodiments, the tolerance of determining component 214 may be configured so that a specified number of path layers are categorized as a simple URL query, but any path deeper than the specified number is classified as a complex URL query. Thus, the tolerance of determining component 214 may vary and, in various embodiments of the present invention, the distinction between a simple URL query and a complex URL query may be configurable.

Simple URL augmenting component 216 is configured to create an augmented query from a simple URL query by word-breaking at least a portion of the URL query, and further configured to associate the augmented query with one or more simple URL ranking preferences. For instance, as previously stated, where the simple URL query is "http://www.cityofseattle.com," simple URL augmenting component 216 will break the query into the text string "city of seattle." Thus, instead of issuing a query, e.g., with issuing component 220 of query issuer 206, utilizing the text string "http://www.cityofseattle.com," an augmented query with word-broken text is created and a query is issued based on the augmented query. In addition to creating an augmented query using word-breaking, simple URL augmenting component 216 is also configured to associate the augmented query with a set of ranking preferences. As discussed above, the ranking preferences may include a primary preference for a document having a URL identical to the URL query. Assuming a document exists with an identical URL, that document would be boosted to the top of a results list, e.g., by ranking component 222 of query issuer 206. Additionally, the ranking preferences may include one or more secondary preferences for documents having at least a portion of the augmented query in the domain name of the document's URL, boosting those documents in the results list, e.g., by ranking component 222 of query issuer 206.

Complex URL augmenting component 218 is configured to create an augmented query from a complex URL query, the augmented query being identical to the URL query, and further configured to associate the augmented query with one or more complex URL ranking preferences. For instance, as previously stated, where the complex URL query is the string "http://www.cityofseattle.com/tourism/restaurants/home," complex URL augmenting component 218 will create an augmented query identical to the URL query. Thus, the query will be issued, e.g., with issuing component 220 of query issuer 206, utilizing a text string identical to the URL query. Combined with one or more complex URL ranking preferences, the augmented query may be configured to force the search results to include only documents having a URL identical to the URL query. Stated differently, the one or more complex URL ranking preferences may be configured to exclude, e.g., by ranking component 222 of query issuer 206, any documents not having an identical URL from the search results.

Query issuer 206 may be a type of computing device, such as computing device 100 described with reference to FIG. 1, for example. As previously discussed and as illustrated in FIG. 2, query issuer 206 is separate from URL query augmenter 204, but in various embodiments query issuer 206 and URL query augmenter 204 may reside on or comprise a single computing device. As illustrated in FIG. 2, query issuer 206 includes an issuing component 220, and a ranking component 222. In various embodiments, query issuer 206 may be used to issue an augmented query, such as a query augmented by simple URL augmenting component 216 or complex URL augmenting component 218, and return a set of documents, or results list, responsive to the issued augmented query. In that regard, issuing component 220 is configured to issue a query utilizing the augmented query to obtain one or more results. Further, ranking component 222 is configured to rank the one or more results in accordance with one or more simple URL ranking preferences or one or more complex URL ranking preferences.

User interface 208 may be a type of computing device, such as computing device 100 described with reference to FIG. 1, for example, and includes at least one presenting component 224. Presenting component 224 is configured to present (e.g., display) information associated with URL query augmenter 204 and/or query issuer 206. For example, the information may be a list of query results ranked according to a set of ranking preferences, the list of query results presented in response to a URL query. User interface 208 may also be configured to receive a URL query from a user. The URL query may be received using a variety of user inputs. For example, the user may input the URL query using a keypad to enter the query or using a mouse device to cut and paste the URL query from another document or application. In another example, the user may input the URL query by voice where user interface 208 is configured for voice recognition.

It will be understood and appreciated by those of ordinary skill in the art that additional components now shown may also be included within any of system 200, database 202, URL query augmenter 204, query issuer 206, and user interface 208.

Figure 3:
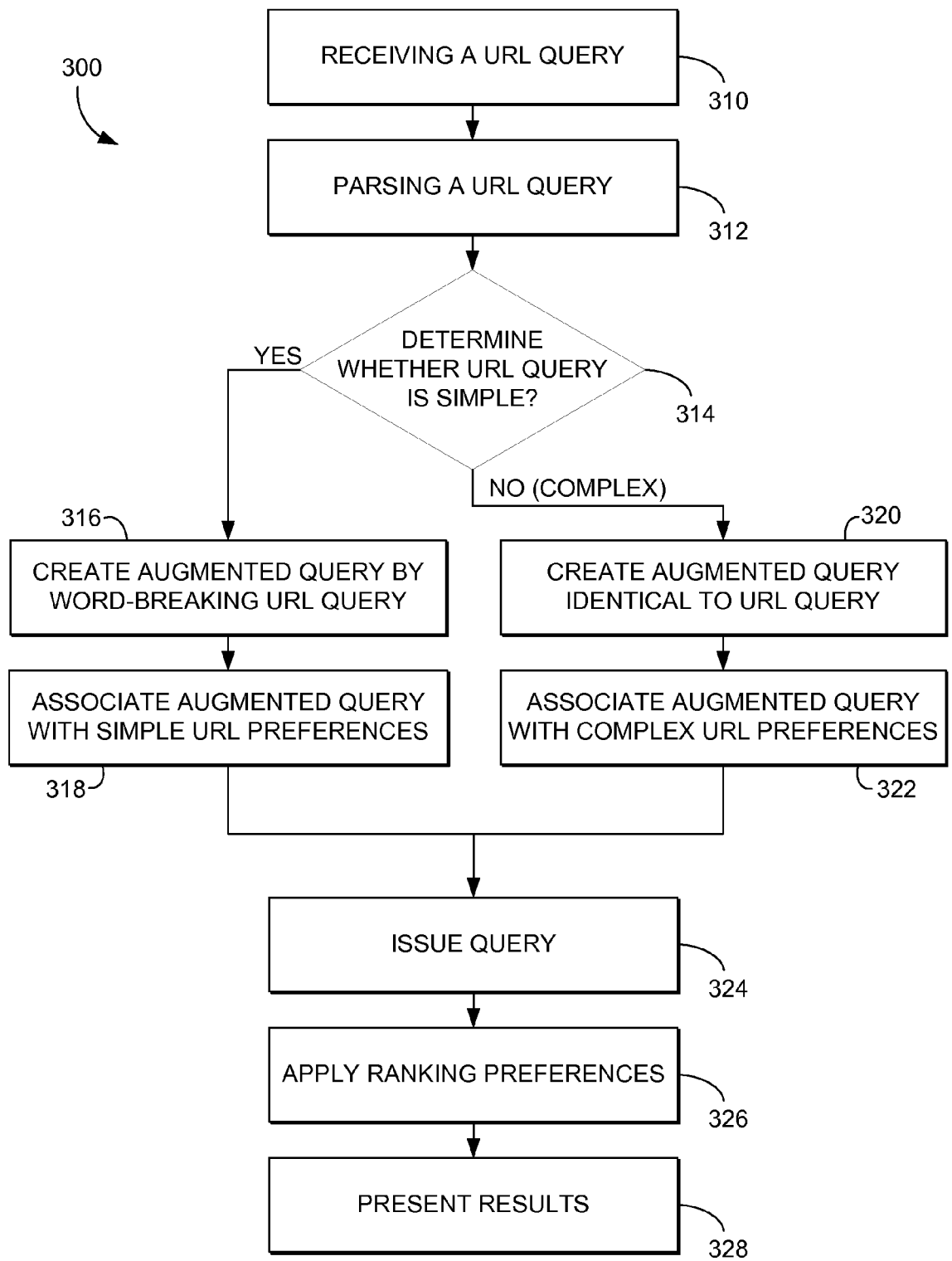
FIG. 3 is a flow diagram illustrating an exemplary method for augmenting URL queries, in accordance with an embodiment of the present invention.

Turning now to FIG. 3, a flow diagram of an exemplary method for augmenting URL queries, in accordance with an embodiment of the present invention, is illustrated and designated generally as reference numeral 300. Initially, as indicated at block 310, a URL query is received, e.g., by receiving component 212 of FIG. 2. By way of example, the URL query may be received directly from a user through a search engine interface. In another example, the URL query may be received from a search engine that, in turn, receives the URL query from the user.

Next, as indicated at block 312, the URL query is parsed. For instance, in various embodiments, the domain name portion of the URL may be extracted from the URL query. Further, the specificity of the URL query may be validated by analyzing the path depth of the URL query. For example, where the URL query is "http://www.cityofseattle.com," the domain name "cityofseattle" may be extracted from the URL query, discarding generic URL information such as "http://," "www," and ".com." The phrase key query portion may be used herein to refer to the portion of the URL query remaining after the parsing. In addition to parsing to obtain the key query portion, the path depth may be set to '0' in the present example because there are no path designations included in the URL query. As another example, where the URL query is "http://www.cityofseattle.com/tourism/restaurants/home," the domain name, or key query portion, "cityofseattle" may again be extracted and, additionally, the path depth for the URL query may be set to a path depth of '3' (e.g./tourism=1; /restaurants=2; and /home=3).

Next, as indicated at block 314, it is determined whether the URL query is simple or complex, e.g., by determining component 214 of FIG. 2. As previously discussed with reference to FIG. 2, the determination regarding whether a URL query is simple or complex may be based upon the path depth of the URL query. For example, where one or more path depth indicators indicate a path depth greater than '0', the URL query may be classified as complex. Thus, the exemplary URL query "http://www.cityofseattle.com/tourism/restaurants/home" would be classified as complex because it has a path depth of '3'. In contrast, the exemplary URL query "http://www.cityofseattle.com" would be classified as simple because it has a path depth of '0'. The example discussed herein distinguishing simple and complex URL queries is intended for illustrative purposes but, as previously stated, the simple/complex determination may be configurable and is not limited to the example discussed here. For instance, in another example, a URL query with one or more path depth indicators indicating a path depth of '1' may be classified as a simple URL query.

If it is determined at block 314 that the URL query is a simple URL query (e.g., path depth of '0'), an augmented query is created by word-breaking at least a portion the URL query, as indicated at block 316. For instance, using the exemplary URL query "http://www.cityofseattle.com," the domain name may be word-broken to create an augmented query ("city of seattle"), e.g., by simple URL augmenting component 216 of FIG. 2. As previously discussed with reference to FIG. 2, the augmented query captures and preserves the user's intent to obtain information related to Seattle, Wash. Next, as indicated at block 318, the augmented query is associated with a set of one or more simple URL preferences, e.g., by simple URL augmenting component 216 of FIG. 2. For example, the simple URL preferences may include a primary preference for a document having a URL that exactly matches the URL query. Thus, using the "http://www.cityofseattle.com" example, if a document had a URL of "http://www.cityofseattle.com," that document would be forced to the top of a results list presented in response to the query. Additionally, by way of example, the simple URL preferences may include a secondary preference for one or more documents having at least a portion of the augmented query in a domain name. For example, where the user enters a URL query of "http://www.cityofseattle.com," documents having URL domain names such as "http://www.seattle.com" and "http://www.city.com" may receive a ranking boost from the secondary preferences associated with the augmented query. Therefore, as discussed above, where there is a simple URL query, not only is the query augmented so the search returns a set of results responsive to a word-broken version of the domain name, but also the query is associated with a set of preferences configured to boost particularly relevant results in the results list.

If, however, it is determined at block 314 that the URL query is a complex URL query (e.g., path depth greater than '0'), an augmented query is created that is identical to the URL query, as indicated at block 320. For instance, using the exemplary URL query "http://www.cityofseattle.com/tourism/restaurants/home," an augmented query identical to the user's URL query would be created, e.g., by complex URL augmenting component 218 of FIG. 2. As previously discussed with reference to FIG. 2, the augmented query captures and preserves the user's intent to obtain a document associated with the specific URL entered into the query. Next, as indicated at block 322, the augmented query is associated with a set of one or more complex URL preferences, e.g., by complex URL augmenting component 218 of FIG. 2. For example, the complex URL preferences may include a preference for a document having a URL that exactly matches the URL query. Additionally, as previously stated with reference to FIG. 2, the complex URL preferences may also include a preference to exclude any document not having a URL exactly matching the URL query. Therefore, where the URL query is complex, a document with an identical URL will appear as the only result to the URL query and, if no such document exists, no documents will be presented because no documents are responsive to the user's specific intent.

Next, as indicated at block 324, a query is issued, e.g., with issuing component 220 of FIG. 2. The query is issued utilizing the augmented query created at either block 316 or 320, depending on whether the URL query was a simple URL query or a complex URL query. For example, where the URL query is the simple URL query "http://www.cityofseattle.com," a query would be issued for the string "city of seattle." If, however, the URL query is a complex URL query such as "http://www.cityofseattle.com/tourism/restaurants/home," a query would be issued for the identical string, or "http://www.cityofseattle.com/tourism/restaurants/home." In any event, the issued query returns a set of documents, or a results list, that is responsive to the issued query.

Next, as indicated at block 326, ranking preferences are applied to the results list, e.g., by ranking component 222 of FIG. 2. Of course, the ranking preferences associated with the issued augmented query will vary depending upon whether the URL query is a simple URL query or a complex URL query. For instance, where the URL query is a simple URL query, the ranking preferences might include a primary preference for the exact match, forcing the exact match to the top of the results list. Additionally, a simple URL query may include one or more secondary preferences that alter the ranking of the results based on a variety of document features with respect to the word-broken query terms. For instance the secondary preferences might include a preference for documents having at least a portion of the augmented query in the domain name of the document's URL. The secondary preference would boost those documents in the results list. Where the URL query is a complex URL query, the ranking preferences may require an exact match between the URL query and a document's URL, excluding any documents not having the exact match from the results list. Finally, as indicated at block 328, the results are presented to the user, e.g., by presenting component 224 of FIG. 2.

In each of the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain the ends and objects set forth above, together with other advantages which are obvious and inherent to the methods, computer-readable media, and systems. It will be understood that certain features and sub-combinations are of utility and may be employed without reference to other features and sub-combinations. This is contemplated by and within the scope of the claims.

The invention claimed is:

1. One or more computer-readable media having computer-usable instructions embodied thereon for performing a method of augmenting uniform resource locator (URL) queries in a search engine, the method comprising:
   receiving a URL query from a user;
   determining whether the URL query is a simple URL query or a complex URL query by:
   (1) parsing the URL query to extract a key query portion; and
   (2) determining whether the key query portion indicates a simple URL query or a complex URL query based on number of layers of path depth or path depth indicators associated with the URL query, wherein no path depth indicators indicates a simple URL query and the existence of the one or more path depth indicators indicates a complex URL query;
   responsive to determining that the URL query is a simple URL query, creating an augmented query by word-breaking at least a portion of the URL query and associating the augmented query with one or more simple URL ranking preferences; and
   responsive to determining that the URL query is a complex URL query, creating an augmented query identical to the URL query and associating the augmented query with one or more complex URL ranking preferences.

2. The computer-readable media of claim 1, wherein the method further comprises:
   issuing a query utilizing the augmented query to obtain one or more results;
   ranking the one or more results in accordance with the one or more ranking preferences; and
   presenting the ranked results to the user.

3. The computer-readable media of claim 1, wherein parsing the URL query to extract the key query portion comprises stripping generic URL information from the URL query.

4. The computer-readable media of claim 1, wherein the portion of the simple URL query that is word-broken is the domain name portion of the URL query.

5. The computer-readable media of claim 1, wherein the one or more simple URL ranking preferences indicate a primary preference for a document having a URL that matches the URL query.

6. The computer-readable media of claim 5, wherein the one or more simple URL ranking preferences further indicate a secondary preference for one or more documents having at least a portion of the augmented query in the domain name.

7. The computer-readable media of claim 1, wherein the one or more complex URL ranking preferences indicate a preference for a document having a URL that matches the URL query.

8. A method of augmenting uniform resource locator (URL) queries in a search engine, the method comprising:
   receiving a URL query from a user;
   determining whether the URL query is a simple URL query or a complex URL query by:
   (1) parsing the URL query to extract a key query portion; and
   (2) determining whether the key query portion indicates a simple URL query or a complex URL query based on number of layers of path depth or path depth indicators associated with the URL query, wherein no path depth indicators indicates a simple URL query and the existence of the one or more path depth indicators indicates a complex URL;
   responsive to determining that the URL query is a simple URL query, creating an augmented query by word-breaking at least a portion of the simple URL query and associating the augmented query with one or more simple URL ranking preferences; and
   responsive to determining that the URL query is a complex URL query, creating an augmented query identical to the URL query and associating the augmented query with one or more complex URL ranking preferences.

9. The method of claim 8, wherein the method further comprises:
   issuing a query utilizing the augmented query to obtain one or more results;
   ranking the one or more results in accordance with the one or more ranking preferences; and
   presenting the ranked results to the user.

10. The method of claim 8, wherein parsing the URL query to extract the key query portion comprises stripping generic URL information from the URL query.

11. The method of claim 8, wherein the one or more complex URL ranking preferences indicate a preference for a document having a URL that matches the URL query.

12. The method of claim 8, wherein the portion of the simple URL query that is word-broken is the domain name portion of the URL query.

13. The method of claim 8, wherein the one or more simple URL ranking preferences indicate a primary preference for a document having a URL that matches the URL query.

14. The method of claim 13, wherein the one or more simple URL ranking preferences further indicate a secondary preference for one or more documents having at least a portion of the augmented query in the domain name.

15. A computerized system for augmenting uniform resource locator (URL) queries in a search engine, the system comprising:
   a receiving component configured to receive a URL query from a user;
   a determining component configured to determine whether the URL query is a simple URL query or a complex URL query by:
   (1) parsing the URL query to extract a key query portion; and
   (2) determining whether the key query portion indicates a simple URL query or a complex URL query based on number of layers of path depth or path depth indicators associated with the URL query, wherein no path depth indicators indicates a simple URL query and the existence of the one or more path depth indicators indicates a complex URL query;

a simple URL augmenting component configured to create an augmented query from a simple URL query by word-breaking at least a portion of the URL query, and further configured to associate the augmented query with one or more simple URL ranking preferences, wherein the one or more simple URL ranking preferences indicate at least one of a primary preference for a document having a URL that matches the URL query and a secondary preference for one or more documents having at least a portion of the augmented query in the domain name of the one or more documents;

a complex URL augmenting component configured to create an augmented query from a complex URL query, the augmented query being identical to the URL query, and further configured to associate the augmented query with one or more complex URL ranking preferences, wherein the one or more complex URL ranking preferences indicate a preference for a document having a URL that matches the URL query; and a database for storing information associated with processing the URL query.

16. The computerized system of claim 15, further comprising:

an issuing component configured to issue a query utilizing the augmented query to obtain one or more results;

a ranking component configured to rank the one or more results in accordance with one or more simple URL ranking preferences or one or more complex URL ranking preferences; and a presenting component configured to present the ranked results to the user.

\* \* \* \* \*